United States Patent [19]
Kim et al.

[11] Patent Number: 5,932,181
[45] Date of Patent: Aug. 3, 1999

[54] NATURAL GAS-USING HYDROGEN GENERATOR

[75] Inventors: Tae Chun Kim; Kyung Shick Yoon; Seong Jae Jeong; Jae Sung Han; Joon Ho Hyoung, all of Taejon, Rep. of Korea

[73] Assignee: Yukong Limited, Seoul, Rep. of Korea

[21] Appl. No.: 08/988,364

[22] Filed: Dec. 10, 1997

[30] Foreign Application Priority Data

Dec. 23, 1996 [KR] Rep. of Korea ...................... 96-70402

[51] Int. Cl.[6] ....................................... B01J 8/04
[52] U.S. Cl. .......................... 422/188; 422/187; 422/191; 422/202; 422/204; 422/211; 422/197; 48/61; 48/199 FM; 55/16
[58] Field of Search .................................... 422/187, 188, 422/191, 202, 204, 211, 197; 48/61, 199 FM; 55/16

[56] References Cited

U.S. PATENT DOCUMENTS

| | | | |
|---|---|---|---|
| 2,135,694 | 11/1938 | Bardwell et al. | 23/7 |
| 2,890,165 | 6/1959 | Bednars et al. | 208/89 |
| 3,679,762 | 7/1972 | La Hue et al. | 260/677 H |
| 4,468,235 | 8/1984 | Hill | 55/16 |
| 4,810,472 | 3/1989 | Andrew et al. | 422/197 |
| 5,565,009 | 10/1996 | Ruhl et al. | 48/197 R |

*Primary Examiner*—Glenn Caldarola
*Assistant Examiner*—Tung Doan
*Attorney, Agent, or Firm*—Seidel, Gonda, Lavorgna & Monaco, PC

[57] ABSTRACT

A natural gas-using hydrogen generator is provided which is able to produce high purity hydrogen from natural gas and water. The generator comprises a desulfurization reactor, a reformer and a PSA. The natural gas-using hydrogen generator also comprises a first pipe line for connecting the reformer with the desulfurization reactor to provide hot combustion gas from the reformer to the desulfurization reactor. A first valve controls air flow being fed to the reformer, which is provided on a second pipe line for feeding air into the reformer. A heat exchanger is provided for exchanging heat between a third pipe line, whose both ends are connected to the second pipe line with the first valve therebetween. A fourth pipe line leads a hot product gas from the reformer to the CO conversion reactor to cool the product gas. A second valve, provided on the third pipe line, controls air flow being fed to the third pipe line.

15 Claims, 4 Drawing Sheets

NATURAL GAS-USING HYDROGEN GENERATOR

BACKGROUND OF THE INVENTION

1. Field of the Invention

The present invention relates, in general, to a hydrogen generator and, more particularly, to a natural gas-using hydrogen generator, which can produce high purity hydrogen from natural gas itself by reacting natural gas with water without the aid of additional equipment.

2. Description of the Prior Art

Production of hydrogen from natural gas is generally accomplished by three techniques: steam reforming; partial oxidation; and autothermal reforming.

Of them, the partial oxidation and the autothermal reforming techniques are economically unfavorable owing to the limit that additional oxygen is to be fed. Thus, the steam reforming technique has been widely employed. Here, the following description will be given based on steam reforming technique.

A typical steam reforming process consists mainly of a reforming step where hydrocarbons are reacted with heated steam to produce various reformed gases and a refining and recovering step where hydrogen gas is recovered from the reformed gases. Examples of the hydrocarbons include natural gas, propane, butane, naphtha, etc.

The following is a detailed description for a conventional steam reforming technique using natural gas as a raw material. Natural gas includes methane as its major component, which reacts with steam as follows:

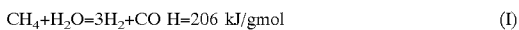

$$CH_4 + H_2O = 3H_2 + CO \quad H = 206 \text{ kJ/gmol} \quad (I)$$

The production of hydrogen and carbon monoxide from natural gas and steam according to Reaction I is usually carried out in the presence of a modifying catalyst (e.g. Ni). As shown, this reaction is strongly endothermic, so that an external heat should be supplied. For this reaction, a temperature of 500 to 1,000° C. should be maintained under a pressure of 1 to 20 atm. To prevent the reverse reaction of methane production and the production of coke on a catalyst, excess steam is to be fed into the reaction system. In case of natural gas, the mole ratio of steam to hydrocarbon should be maintained in a range of about 3 to 3.5.

In a large hydrogen plant, a reformer comprises a large furnace in which a plurality of catalyst tubes are operated at a temperature of 900 to 1,000° C. In spite of such high temperatures, its heat efficiency is as low as 60 to 70%.

In addition to Reaction I, the conversion reaction of carbon monoxide into hydrogen occurs as represented by the following Reaction II:

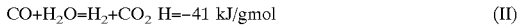

$$CO + H_2O = H_2 + CO_2 \quad H = -41 \text{ kJ/gmol} \quad (II)$$

Reaction II, so-called water/gas shift reaction, is exothermic so that, as the reaction temperature is lower, the conversion of carbon monoxide is higher. Accordingly, the reaction is heated only up to a temperature of 180 to 300° C. while maintaining the pressure from 1 to 20 atm. Carbon monoxide is high in concentration at the outlet of the reformer, which is operated at a high temperature. A heat exchanger is provided at the tail of the reformer with the aim of lowering the temperature of the gas and the gas is allowed to pass through a conversion reactor (in which Cu type catalyst is filled) with the aim of lowering the concentration of carbon monoxide and increasing the yield of hydrogen.

Natural gas contains a trace of sulfur compounds which serve to alert the leakage of natural gas by their characteristic odor. During the reaction, these sulfur compounds are coated on the reformer catalysts, which then become incapacitated. Thus, it should be pre-treated to be desulfurized. For this, a desulfurization reactor filled with hydrodesulfurization catalysts and absorption catalysts of $H_2S$ (hydrogen sulfide) is set at the head of the reformer and maintains a temperature of 150 to 350° C.

Largely, the start up time of the total system depends upon the period which it takes the desulfurization reactor to be ready for operation. Conventionally, the desulfurization reactor is warmed-up by an electric heater or indirectly preheated by exchanging the heat which occurs when nitrogen flows. In addition, an additional gas boiler is set to convert water material into steam.

This electric heater which is to warm up the desulfurization reactor of the conventional natural gas-using hydrogen generator causes a high temperature locally around it, deteriorating the desulfurization catalyst. In addition, the electric heater is economically unfavorable because the maintenance cost is high owing to its consuming a great deal of power. Because the electric heater is difficult to set up in the desulfurization reactor, its assembly is significantly low in productivity.

Further, the additional gas boiler is required to generate steam, which results in an excess of the hydrogen generator. Moreover, the product gas containing hydrogen from the reformer does not reach the conversion reactor without heat recovery and reuse, so that the total heat efficiency of the hydrogen generator is remarkably lowered.

SUMMARY OF THE INVENTION

Therefore, it is an objective of the present invention to overcome the above problems encountered in prior arts and to provide a compact natural gas-using hydrogen generator which is remarkably reduced in the number of equipment parts so that the space necessary to set it up can be reduced.

It is another objective of the present invention to provide a natural gas-using hydrogen generator which is low in manufacture cost and establishment cost.

It is a further objective of the present invention to provide a natural gas-using hydrogen generator which comprises a desulfurization reactor that needs no electric heater, so that the hydrogen generator is significantly improved in assembly productivity, necessary start-up time, and heat efficiency.

In accordance with the present invention, the above objectives can be accomplished by a provision of a natural gas-using hydrogen generator comprising a desulfurization reactor, a reformer, a CO conversion reactor and a P.S.A. (Pressure Swing Unit Absoption), wherein said natural gas-using hydrogen generator further comprises a first pipe line for connecting said reformer with the desulfurization reactor to provide hot combustion gas from the reformer to the desulfurization reactor and to preheat the desulfurization reactor; a first valve means for controlling air flow being fed to the reformer, which is provided on a second pipe line for feeding air into the reformer; a heat exchanger for exchanging heat between a third pipe line, whose both ends are connected to the second pipe line with the first valve means being therebetween, and a fourth pipe line which leads a hot product gas from the reformer to the CO conversion reactor, to cool the product gas; and a second valve means for controlling air flow being fed to the third pipe line, which is provided on a desired position of the third pipe line.

BRIEF DESCRIPTION OF THE DRAWINGS

Other objectives and aspects of the invention will become apparent from the following description of embodiments with reference to the accompanying drawings in which.

DETAILED DESCRIPTION OF THE PREFERRED EMBODIMENTS

Figure 1:
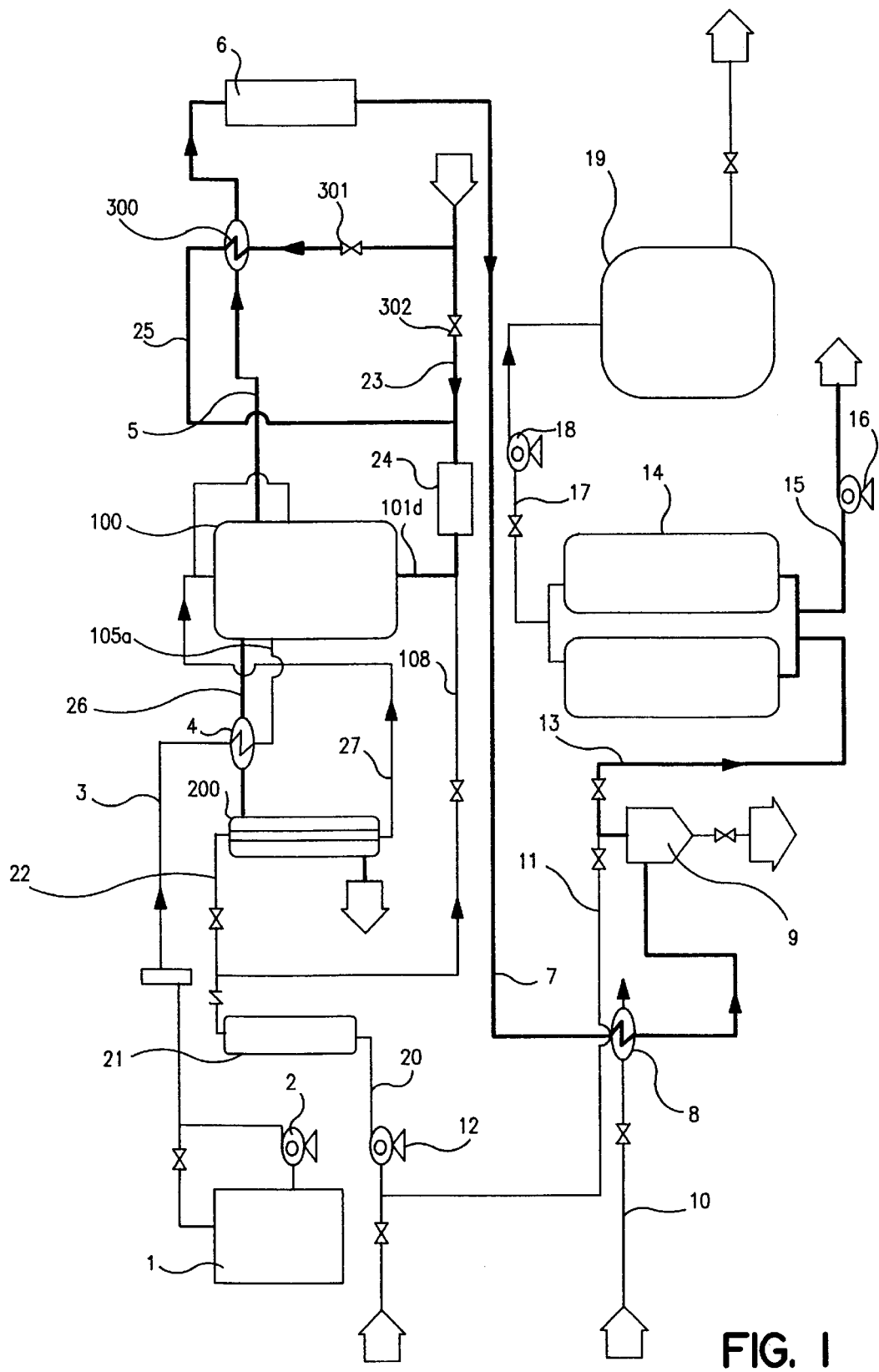
FIG. 1 is a process flow of a hydrogen generator according to the present invention.

The application of the preferred embodiment of the present invention is best understood with reference to the accompanying drawings, wherein same reference numerals are used for same and corresponding parts, respectively.

Referring to FIG. 1, there is a process flow in the natural gas-using hydrogen generator according to the present invention. As shown in FIG. 1, the natural gas-using hydrogen generator of the present invention comprises a reformer 100, a desulfurization reactor 200, a heat exchanger 300, a P.S.A. 14, pipe lines 23, 25 and 26, and a pair of valve means 301 and 302.

According to the process flow, a water-supply tank 1 is connected through a heat exchanger 4 to a water inlet 105a of the reformer 100 by a pipe line 3. The water stored in the water-supply tank 1 is driven by a pump 2 and supplied to the reformer 100 via the pipe line 3.

Hot product gas is generated in the reformer 100, exhausted out of its product gas outlet 101c and transferred through the heat exchanger 300 to the inlet of a CO conversion reactor 6 via a fourth pipe line 5. The outlet of the CO conversion reactor 6 is connected through a heat exchanger 8 to a separator 9 via a pipe line 7.

In the heat exchanger 8, the product gas from the CO conversion reactor 6 is cooled by the cooling water supplied via a pipe line 10 and thus, the product gas with ordinary temperatures is transferred to the separator 9.

In the separator 9, the product gas is separated from accompanying water which is, then, drained out. Almost all of the product gas is supplied via a pipe line 13 to a P.S.A. apparatus 14 in which the crude hydrogen is purified to a degree of high purity. For providing hydrogen for a desulfurization reaction, a trace of the product gas is passed into a compressor 12 via a pipe line 11.

The P.S.A. apparatus 14 is filled with molecular sieves which serve to adsorb CO, $CO_2$, $CH_4$, $H_2O$ and the like other than $H_2$ for removal. While three atmosphere pressure operation and vacuum reproduction are alternatively carried out according to these adsorbent beds, highly pure hydrogen is produced. Off gas, which is generated upon the vacuum reproduction, is progressed along a pipe line 15 and stored in a tank with the aid of a vacuum pump 16. This can be a fuel source for the reformer 100. On the other hand, the highly pure hydrogen is highly pressured by a compressor 18 and led to a product gas tank 19 along a pipe line 17.

Natural gas is pressurized by a compressor 12 and proceeds, along a pipe line 20, to a natural gas storage tank 21 which is connected to the desulfurization reactor 200 by a pipe line 22.

Air which enters the reformer 100 is preheated by a heater 24 and directed to an air inlet 101d of the reformer 100. A natural gas fuel pipe 108 is divided from the pipe line 22 and connected to the air inlet 101d so that air-mixed fuel is provided to the reformer 100.

At a desired position of a second pipe line 23, a first valve means 302 is provided in order to control the air which is fed to the heater 24. The second pipe line 23 branches at a desired position between the first valve means 302 and the heater 24. Branched third pipe line, denoted by reference numeral "25", is directly led to the heat exchanger 300 and then, returns to a desired position of the second pipe line 23, but at a different position. The second valve means 301 is provided between a returning point of the second pipe line 23 and the heat exchanger 300, to control the flow rate of the air which is to exchange heat with the hot product gas guided from the reformer 100 by the pipe line 5.

Hot combustion heat occurs at the reformer 100 and is transferred to the desulfurization reactor 200 via the first pipe line 26, serving to preheat the desulfurization reactor 200.

The first pipe line 26 whose one end attaches to the desulfurization reactor 200 is extended to a combustion gas outlet 101b of the reformer 100. During this extension, the pipe line 3 passes through the heat exchanger 4 at which the water introduced along the pipe line 3 is preheated by the hot combustion heat.

The fuel which is deprived of sulfur by the desulfurization reactor 200 is fed to the reformer 100 via a pipe line 27. That is, the pipe line 27 runs from the outlet of the desulfurization reactor 200 to the natural gas feed inlet 101a of the reformer 100.

Figure 2:
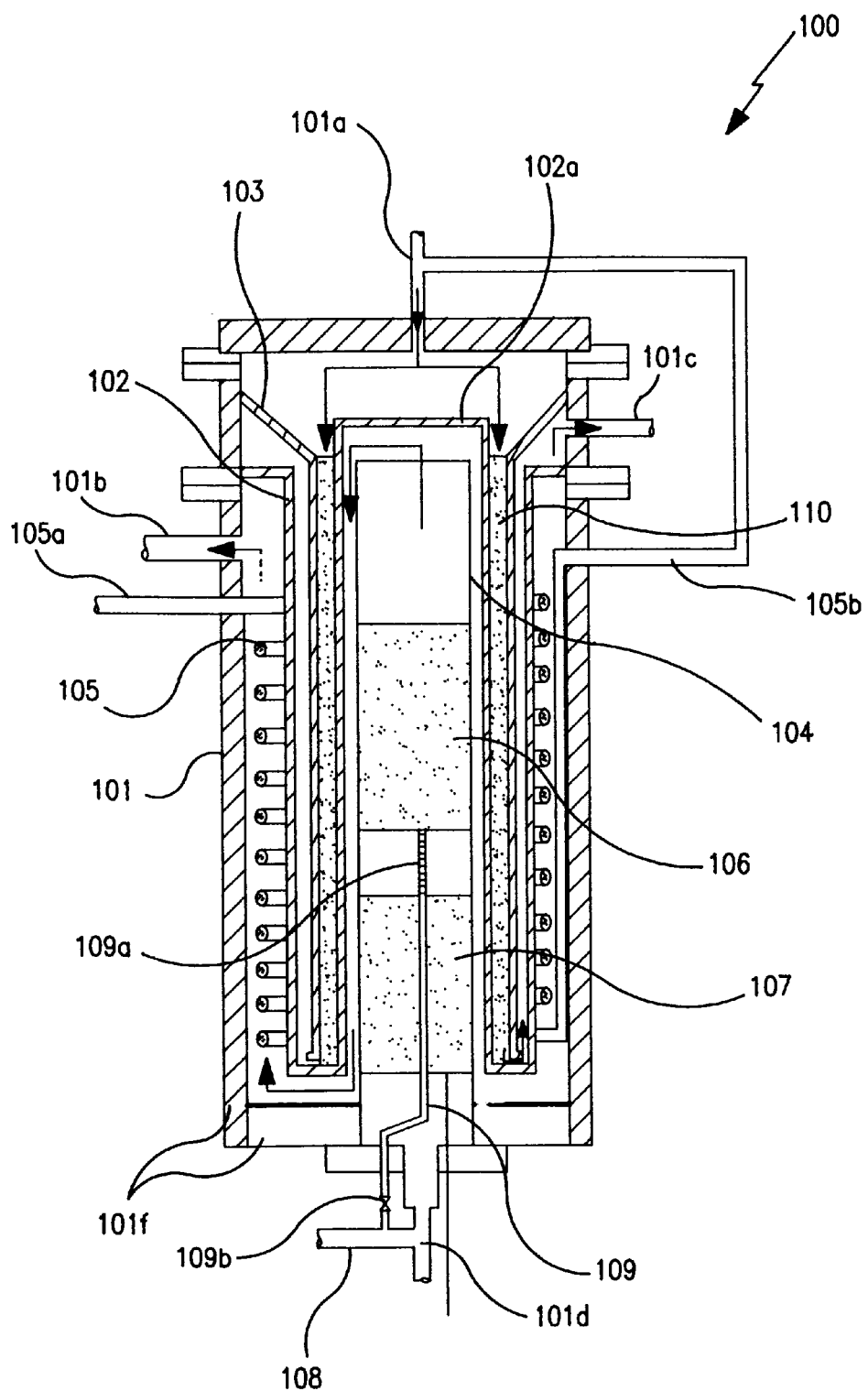
FIG. 2 is a schematic cross-sectional view showing a reformer according to an embodiment of the present invention.

Referring to FIG. 2, there is a reformer structure according to a first embodiment of the present invention. As seen, a reformer 100 is provided largely with a casing 101, a reforming tube 102, a separator plate 103 for the reforming tube 102, a combustion compartment 104 and a coil 105 for producing steam.

The casing 101 is hollow with a desired diameter and a desired length. It is heat shielded by an insulation material 101f, having a natural gas feed inlet 101a, a combustion gas outlet 101b, a product gas outlet 101c and an air inlet 101d at its upper surface, side surface and lower surface. In detail, the natural gas feed inlet 101a is directly connected to the hollow cavity of the casing 101 at the center of its top surface, upwardly extending. The combustion gas outlet 101b and the product gas outlet 101c each are directly connected to the inside hollow at a desired position of the circumference of the casing 101, outwardly extending. Likewise, the air inlet 101d is located at the center of the bottom surface, downwardly extending.

In the hollow of the casing 101, the reforming tube 102, the separator plate 103 for the reforming tube 102, the combustion compartment 104, and the coil 105 for producing steam are fixedly mounted.

The combustion compartment 104 is a kind of cylinder with a desired diameter and a desired length and its lower surface adheres closely to the bottom of the hollow of the casing 101. Being directly connected to the air inlet 101d of the casing 101, the combustion compartment 104 has combustion catalyst systems 106 and 107 at its upper and lower parts. The combustion catalyst systems each are of cylindrical structure and their catalytically active component is prepared from palladium and precious metals.

At a desired position of the air inlet 101d of the casing 101 is provided a natural gas fuel pipe 108 which is divided into a fuel injection pipe 109 at a desired position. The fuel injection pipe 109 is fixed in such a way that it vertically penetrates through the bottom surface of the casing 101 into the central inside of the combustion compartment 104 at a desired span. While a plurality of injection holes 109a are formed on the outer circumference of an upper part of the fuel injection pipe 109, a valve 109b is provided at the lower end thereof.

As for the reforming tube 102, a cross sectional view of an inverted hat is given. On a downward protrusion of the reforming tube 102, an upwardly bent concave 102a with a desired diameter and a desired length is provided, leaving a certain space from the combustion compartment 104. The upper end of the reforming tube 102 is sealingly bonded along the upper inner circumference of the inside hollow of the casing 101, compartmenting the inner hollow of the casing 101 while the lower surface thereof is a desired space apart from the bottom of the inside hollow of the casing 101, defining a flow passage of the combustion gas.

The separator plate 103 for the reforming tube 102 has a cylindrical shape with a desired diameter and a desired length, on the whole. Its upper part is a funnel form that is outwardly bent at a certain angle and sealingly bonded along the upper inner circumference of the hollow of the casing 101. On the other hand, the lower surface is a desired space apart from the bottom of the reforming tube 102, compartmenting the interior of the reforming tube 102.

The coil 105 for producing steam is a tube with a desired diameter and closely winds around the outer circumference surface of the reforming tube 102 in a spiral form. Its opposite ends externally extend through respective desired positions of the casing 101, one end serving as a water inlet 105a and the other serving as a steam outlet 105b. The latter is connected to the natural gas feed inlet 101a of the casing 101.

In the inner space between the reforming tube 102 and the separator plate 103 for the reforming tube 102, a reformer catalyst 110 having a type of nickel is filled.

Figure 3:
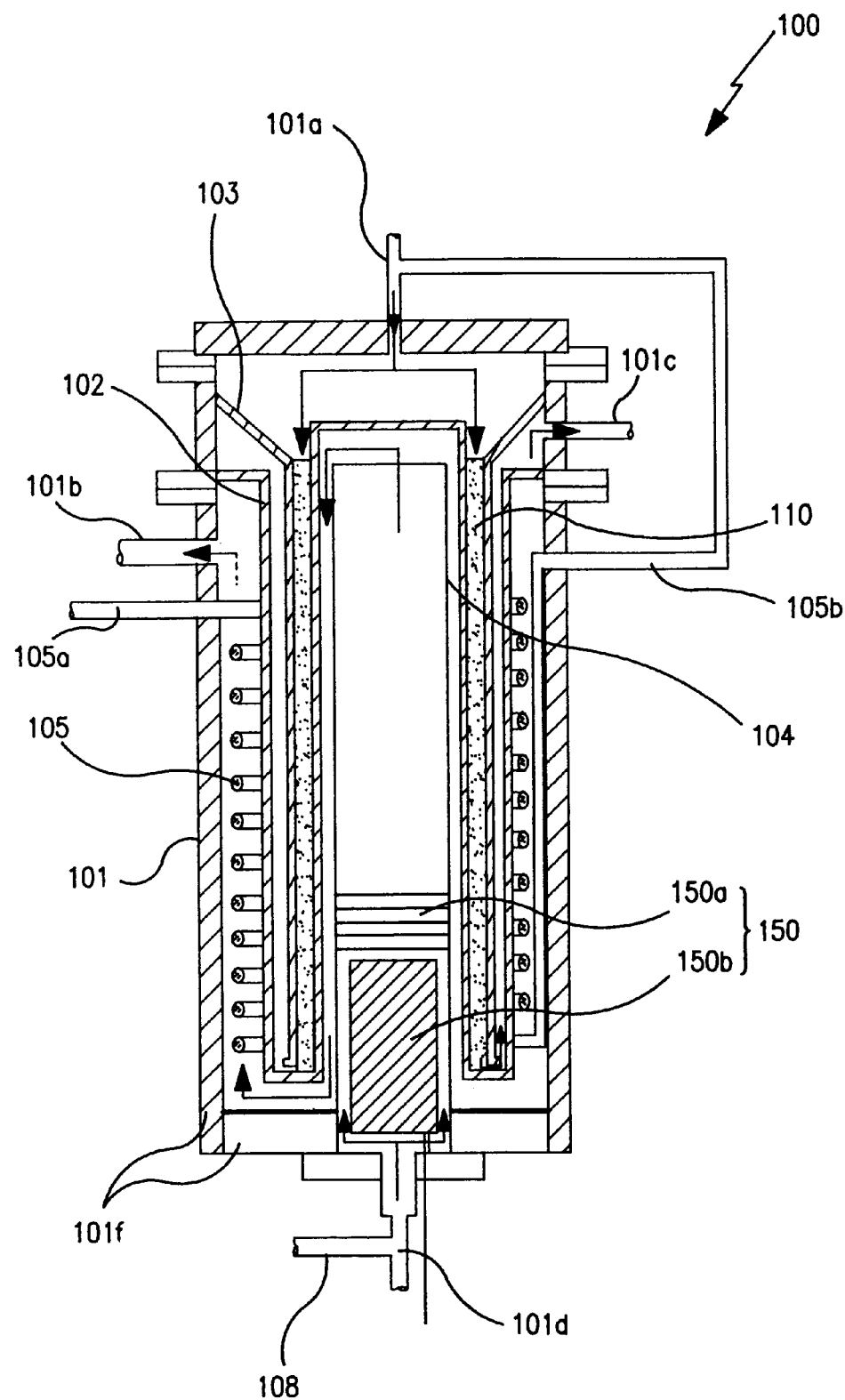
FIG. 3 is a schematic cross-sectional view showing a reformer according to another embodiment of the present invention.

Now, with reference to FIG. 3, there is a reformer structure according to a second embodiment of the present invention. This reformer is largely similar to that of the first embodiment except for a combustion catalyst system 150 provided in a combustion compartment 104 and the absence of the fuel injection pipe 109 of FIG. 2 according to the characteristics of the combustion catalyst system 150.

The combustion catalyst system 150 consists of a plurality of sheets of circular wire mesh coated with palladium 150a and a cylindrical metal construct coated with palladium 150b and is fixedly set beneath the combustion compartment 104. When a mix of fuel and air flows through the narrow spaces of the cylindrical metal construct 150b and the combustion compartment 104, a primary combustion occurs, burning 40% of the mix. The remainder is completely burned while passing a plurality of sheets of circular wire mesh 150a.

Figure 4:
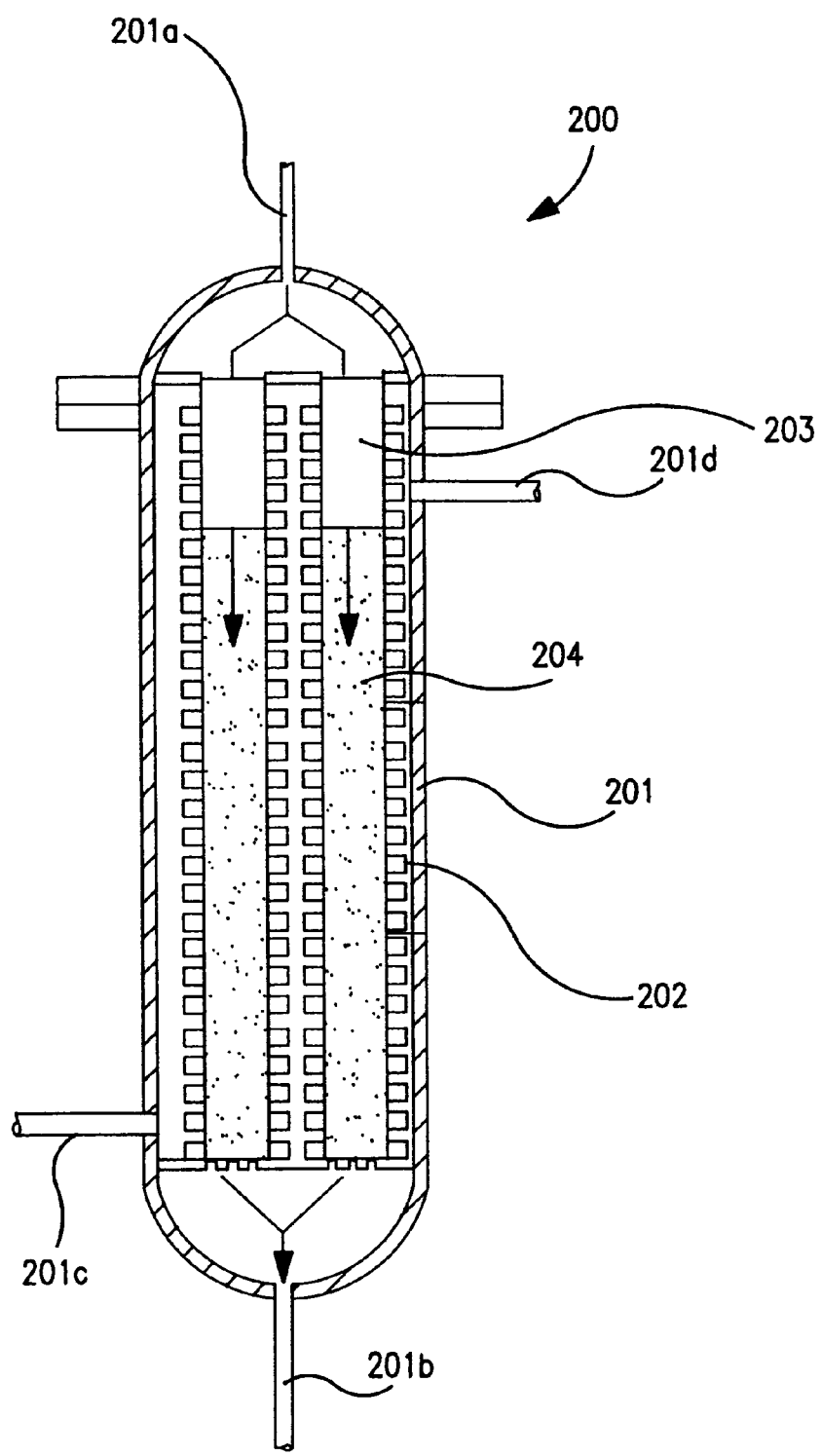
FIG. 4 is a schematic cross-sectional view showing a desulfurization reactor according to the present invention.

Now, with reference to FIG. 4, there is a desulfurization reactor according to the present invention. This desulfurization reactor 200 is comprised largely of a casing 201 and a plurality of finned tubes 202.

A tube configuration which has a cavity therein is given to the casing 201 and its opposite top and bottom surfaces are dome-shaped. A natural gas inlet 201a is located at the top surface, penetrating into the cavity while a natural gas outlet 201b is at the bottom surface, penetrating into the cavity. With direct connection to the cavity, a combustion gas outlet 201c and a combustion gas inlet 201d are each integrated into the casing 201 at a desired position of its circumference. In the cavity of the casing 201, a plurality of the finned tubes 202, preferably at least 3 in number, are fixedly settled in a vertical direction.

Being overlaid by a hydrodesulfurization catalyst layer 203, an absorption catalyst layer 204 of hydrogen sulfide ($H_2S$) is filled in the lower part of the finned tube 202.

The natural gas inlet 201a is extended to the natural gas storage tank 21 via the pipe line 22 for the provision of natural gas to the desulfurization reactor 200.

The resulting desulfurized natural gas flows off through a natural gas outlet 201b and is led to the natural gas feed inlet 101a via the pipe line 27 to enter the reformer 100.

Preheated by the hot combustion gas provided from the reformer 100, the combustion gas inlet 201d is directly connected to the combustion gas outlet 101b of the reformer 100 via the first pipe line 26. The combustion gas introduced into the cavity is drained off through the combustion gas outlet 201c.

Accordingly, the natural gas-using hydrogen generator in accordance with the present invention comprises the first valve means 302 to control the flow rate of air provided the heater 24 on the air-providing second pipe line 23, the third pipe line 25 whose both ends are connected to the second pipe line 23, the second valve means 301 existing at a desired position of the third pipe line 25 for air control, the heat exchanger 300 which exchanges the heat between the third pipe line 25 and the forth pipe line 5 to cool the hot product gas from the reformer 100, and the first pipe line 26 which connects the combustion gas outlet 101b of the reformer 100 with the combustion gas inlet 201d of the desulfurization reactor 200, wherein said desulfurization reactor 200 is uniformly and directly preheated by the hot combustion gas produced from the reformer 100 without any additional boiler and electric heater system, whereby the total start-up time can be reduced, the time which it takes to be ready for initial operating can be reduced and a significant improvement can be made to the optimal temperature condition and the heat efficiency.

As described hereinbefore, the natural gas-using hydrogen generator is characterized in that a reformer 100 and a desulfurization reactor 200 are interconnected with each other, so that the hot combustion gas produced upon operating the reformer 100 is provided to and directly preheats the desulfurization reactor 200, thereby reducing the total start-up time of said hydrogen generator. In addition, it is further furnished with the first valve means 302 to control the flow rate of air provided to the heater 24 on the air-providing second pipe line 23, the third pipe line 25, the second valve means 301 provided on the third pipe line 25 for controlling air flow, and the heat exchanger 300 in which heat exchanges between the third pipe line 25 and the fourth pipe line 5 to cool the product gas from the reformer 100, thereby significantly reducing the time that it takes the hydrogen generator to be ready for initial operating and improving the optimal temperature condition and the heat efficiency thereof. Moreover, such a structure according to the present invention enables the hydrogen generator to be well operated without any additional preheater for the desulfurization reactor and thus, to be manufactured smaller. Also, there is an economic advantage that installation and maintenance costs are low.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A natural gas-using hydrogen generator comprising a desulfurization reactor, a reformer, a CO conversion reactor, a Pressure Swing Absorption Unit and:

a first pipe line for connecting said reformer with said desulfurization reactor to provide combustion gas from said reformer to said desulfurization reactor and to preheat said desulfurization reactor, the desulfurization reactor having a combustion gas inlet and the reformer having a combustion gas oulet;

a first valve means for controlling air flow being fed to said reformer, said first valve means provided on a second pipe line for feeding air into the reformer;

a heat exchanger for exchanging heat between a third pipe line, both ends of the third pipe line connected to said second pipe line with said first valve means being therebetween, and a fourth pipe line which conveys a product gas form said reformer to said CO conversion reactor, to cool said product gas; and a second valve means for controlling air flow being fed to said third pipe line, the second valve means provided on a position of said third pipe line.

2. The natural gas-using hydrogen generator in accordance with claim 1, wherein said reformer comprises:

a cylindrical casing having a hollow cavity;

a combustion compartment, having an upper part and a lower part, mounted in the longitudinal direction of the hollow cavity;

a reforming tube vertically fixed in the interior of said hollow cavity, surrounding said combustion compartment at a distance;

a separator plate for separating the interior of said reforming tube, which is vertically fixed at a distance apart from the bottom of said reforming tube;

a coil for producing steam, which winds around the circumference of the reforming tube, and the coil having opposing ends extending through the casing into the exterior of the casing;

a natural gas feed inlet connected directly to said hollow cavity at the center of the top surface of said casing, with its end extending to one end of said coil;

a reformer catalyst system filling the space between the inner side of said reforming tube and the inner side of said plate;

a combustion catalyst system fixed at positions of the upper and lower part within the combustion compartment;

an air inlet connected directly to said hollow cavity at the center of the bottom surface of said casing, with one end downwardly extending to a heater;

a natural gas fuel pipe branching off from a position of said air inlet;

a combustion gas outlet directly connecting the space between the outer side of said reforming tube and the inner side of said casing; and a product gas outlet connected directly to an inner space which is defined in said casing by said reforming tube.

3. The natural gas-using hydrogen generator in accordance with claim 1, wherein said desulfurization reactor comprises:

a casing having a hollow cavity therein, a natural gas inlet and a natural gas outlet which are respectively connected to said hollow cavity at a top surface and a bottom surface thereof, and a combustion gas inlet and a combustion gas outlet which are each connected to said hollow cavity at a position on the circumference thereof; and a plurality of finned tubes fixedly settled in said hollow cavity of said casing, in which a hydrodesulfurization catalyst layer and an adsorption catalyst layer of hydrogen sulfide are filled in descending order.

4. The natural gas-using hydrogen generator in accordance with claim 1, wherein said first pipe line connects said desulfurization reactor with said reformer so that one end of said first pipe line is attached to said combustion gas inlet of said desulfurization reactor and the other end of said first pipe line is attached to said combustion gas outlet of said reformer.

5. The natural gas-using hydrogen generator in accordance with claim 2, wherein said first pipe line connects said desulfurization reactor with said reformer so that one end of said first pipe line is attached to said combustion gas inlet of said desulfurization reactor and the other end of said first pipe line is attached to said combustion gas outlet of said reformer.

6. The natural gas-using hydrogen generator in accordance with claim 3, wherein said first pipe line connects said desulfurization reactor with said reformer so that one end of said first pipe line is attached to said combustion gas inlet of said desulfurization reactor and the other end of said first pipe line is attached to said combustion gas outlet of said reformer.

7. The natural gas-using hydrogen generator in accordance with claim 2, wherein said combustion catalyst system comprises two catalyst units which each have a cylindrical shape and are provided on the upper part and the lower part of said combustion compartment, the catalyst units containing palladium.

8. The natural gas-using hydrogen generator in accordance with claim 2, wherein said combustion catalyst system comprises two catalyst units, one unit having a cylindrical shape and coated with a palladium type metal and fixedly provided at the lower part of said combustion compartment and the other catalyst unit being in the form of sheets of circular wire meshes which are coated with palladium and fixedly provided at the upper part of the combustion compartment.

9. The natural gas-using hydrogen generator in accordance with claim 2, wherein said coil for producing steam is a tube with opposite ends which externally extend through respective positions of said casing, one end serving as a water inlet and the other end serving as a steam outlet.

10. The natural gas-using hydrogen generator in accordance with claim 9, wherein said steam outlet is connected to said natural gas feed inlet.

11. The natural gas-using hydrogen generator in accordance with claim 3, wherein said finned tubes are at least 3 in number.

12. The natural gas-using hydrogen generator in accordance with claim 2, wherein said natural gas fuel pipe branches off at a position into a fuel injection pipe which vertically penetrates through the bottom surface of said casing into the combustion compartment, the fuel injection pipe serving to inject fuel to said combustion catalyst system and having a plurality of injection holes formed on the circumference of an upper part thereof.

13. The natural gas-using hydrogen generator in accordance with claim 7, wherein said natural gas fuel pipe branches off at a position into a fuel injection pipe which vertically penetrates through the bottom surface of said casing into the combustion compartment, the fuel injection pipe serving to inject fuel to said combustion catalyst system and having a plurality of injection holes formed on the circumference of an upper part thereof.

14. The natural gas-using hydrogen generator in accordance with claim 12, wherein said fuel injection pipe is provided with a valve means for monitoring fuel supply and controlling fuel flow.

15. The natural gas-using hydrogen generator in accordance with claim 13, wherein said fuel injection pipe is provided with a valve means for monitoring fuel supply and controlling fuel flow.

* * * * *